Dec. 12, 1933.   H. ROSENTHAL   1,939,084
METHOD OF PRODUCING PROPYLENE
Filed Sept. 4, 1930
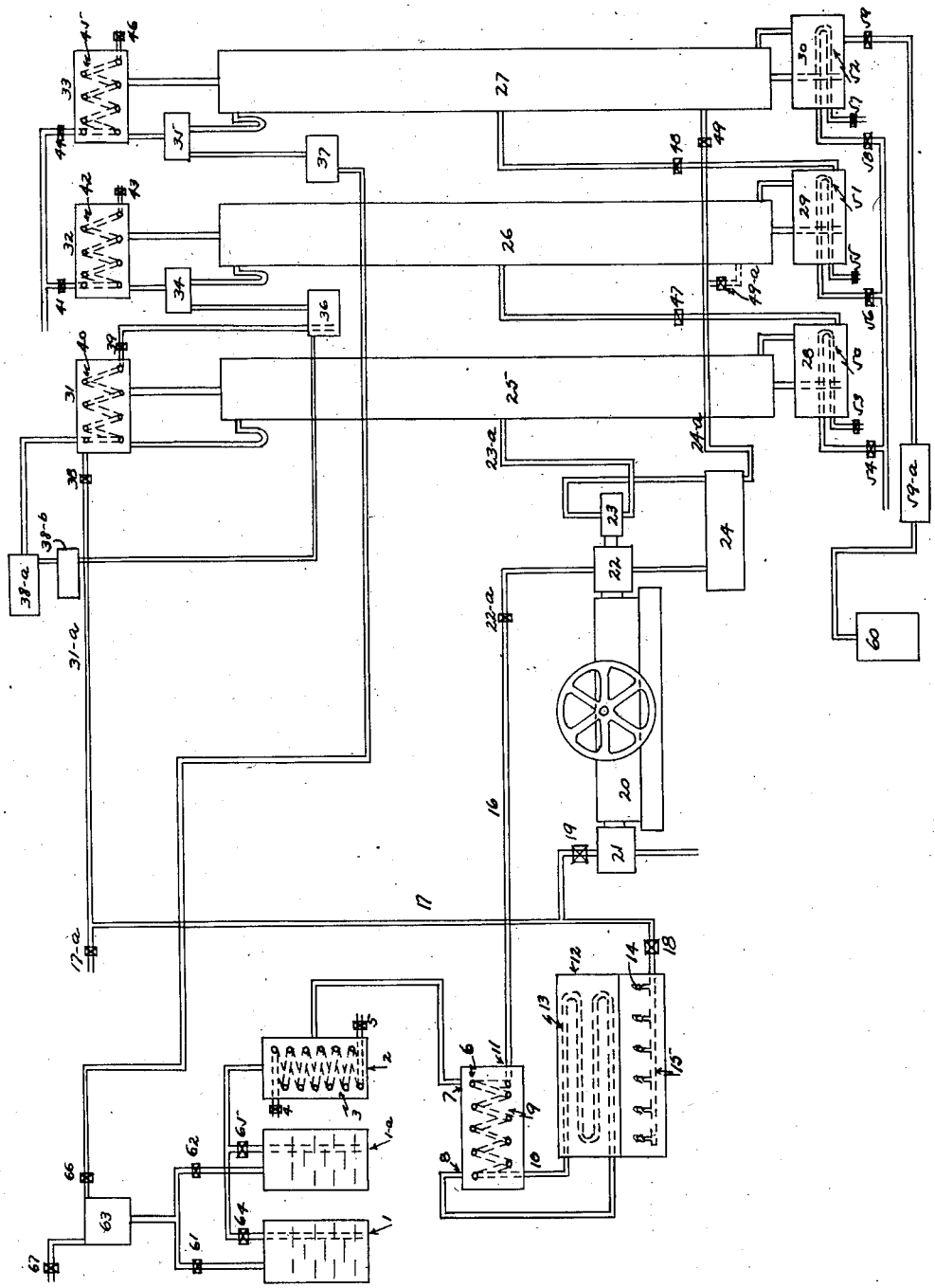
INVENTOR
Henry Rosenthal
BY
Pennie Davis Marvin & Edmonds
ATTORNEY Patented Dec. 12, 1933

1,939,084

UNITED STATES PATENT OFFICE 1,939,084

METHOD OF PRODUCING PROPYLENE

Henry Rosenthal, New York, N. Y., assignor to Columbia Engineering & Management Corporation, New York, N. Y., a corporation of Ohio Application September 4, 1930. Serial No. 479,664

7 Claims. (Cl. 260—170)

The object of this invention is the recovery of propylene produced by the pyrolitic treatment of butane.

When butane is heated under certain conditions the molecule is disrupted with the formation of a number of chemical compounds and the separation of the elements hydrogen and carbon. This action starts at about 500° C. and becomes more active as the temperature increases and at temperatures above 1000° C. the action will go nearly to completion with the formation of hydrogen and carbon and relatively small amounts of compounds. At intermediate temperatures the primary reaction may be represented by the following equations

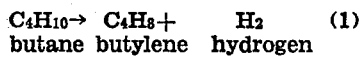
$$C_4H_{10} \rightarrow C_4H_8 + H_2 \quad (1)$$
butane  butylene  hydrogen

$$C_4H_{10} \rightarrow C_3H_6 + CH_4 \quad (2)$$
butane  propylene  methane

$$C_4H_{10} \rightarrow C_2H_4 + C_2H_6 \quad (3)$$
butane  ethylene  ethane The butylene, propylene, methane, ethylene, and ethane formed by the above reactions are subject to further dissociation if the temperature of the reaction is sufficiently high and the length of heating is sufficiently long. As the longer chain molecules are more easily disrupted than the shorter chain molecules continuation of heating or increase of temperature results in the production of greater quantities of carbon, hydrogen, methane, ethane, and ethylene, per unit of the butane which is cracked in the process. This will be accompanied by a decrease in the amounts of butylene and propylene produced per unit of butane cracked.

Propylene is an olefinic hydrocarbon which is desirable as the starting point for a number of organic syntheses. There is a fairly large production of butane, the principal value of which is as a relatively cheap fuel. It is therefore of commercial advantage to process a portion of this large supply of butane for the production of propylene.

When butane vapor at a pressure between atmospheric and eighty pounds gauge is heated to a temperature between 650° C. and 700° C. and is kept in the reaction zone for a period ranging between ½ second and 2½ seconds, reaction (2) above is the predominant one. Under these conditions, propylene and methane are the principal products resulting from the cracking although reactions (1) and (3) also occur along with secondary cracking reactions as well as some polymerization. The resulting products from the reaction is therefore a complex mixture which is further complicated by the fact that under the conditions given above, which conditions lead to a relatively large amount of propylene per unit of butane cracked, only 20 per cent to 35 per cent by weight of the butane passed through the reaction zone will be cracked, the balance passing through the reaction zone without decomposing, and its vapor being mixed with the vapors and gases resulting from the cracking. The following is a typical analysis of the material resulting from the pyrolysis of butane under the above conditions

|  | Percent by gas volume | Percent by weight |
|---|---|---|
| Hydrogen | 1.5 | .1 |
| Methane | 19.2 | 7.1 |
| Ethane | 1.8 | 1.2 |
| Ethylene | 6.0 | 3.7 |
| Propane | 2.0 | 2.0 |
| Propylene | 14.7 | 14.0 |
| Butane | 54.0 | 70.9 |
| Butylene | .8 | 1.0 |
| Higher hydrocarbons | Trace. |  |
|  | 100.0 | 100.0 |

Practically no carbon will be formed during the reaction and as can be seen from the analysis the propylene content is about 75 per cent by weight of the total olefine hydrocarbons present. The propylene thus produced will exceed 50 molecules of propylene per 100 molecules of butane actually cracked, and this yield of propylene to butane can be easily attained within the operating limits given above. These conditions are to a certain extent interdependent. Thus if the rate of flow through the reaction chamber is varied or the pressure of the butane vapor is varied, the temperature of the reaction will have to be changed to some extent to compensate for the changes in rate or pressure. The amount of cracking and the amount of propylene per unit of butane cracking can be maintained, however, at approximately the figures shown above by operating within the range of temperature, pressure and rate described. The volume of the gaseous products of the reaction are approximately 1.2 to 1.5 times the volume of the original butane.

It can be seen that the cracking operation thus produces the propylene as one of the components of a complex mixture of vapors and gases, of which the propylene is but about 15% by gas volume. All of the components of the mixture are essentially gases with the exception of traces of the higher hydrocarbons which are principally benzol, toluol and xylol. With the exception of the traces of the higher hydrocarbons, the least volatile component of the mixture is the butane component which under atmospheric pressure vaporizes at about 0° C. even in a pure state and when present in a gas of the nature of that produced by the above reaction would not condense from the mixture until cooled to about −15° C. when the mixture is maintained at atmospheric pressure. Even the partial pressure of the heavier hydrocarbons in an atmospheric pressure mixture is such that at ordinary temperatures these components will be essentially gaseous. Thus the problem of obtaining propylene from the mixture produced by pyrolysis of butane is one involving the separation of one gaseous substance from a mixture of gaseous substances.

I have found that such separation can be made with little loss of propylene and with the recovery of a commercially pure propylene by a proper system utilizing a method of condensation and fractionation. By this method I am not able to separate the propane from the propylene, but as the pyrolysis produces only about .13 part propane per part of propylene the fractionation results in a product containing a propylene content greater than 80% where the propylene content of the material before fractionation is only 15%. By the method I use, the butane is recovered along with the butylene and is recirculated through the cracking furnace for pyrolysis. The gases, hydrogen, methane, ethylene, and ethane which are recovered together may be used as fuel in the process or for other purposes as may be desirable, and the higher hydrocarbons, including benzol, xylol, and toluol are recovered together and may be used for any purpose for which these materials are commonly used.

The gases leaving the reaction chamber are first compressed to a pressure in excess of four hundred pounds per square inch, and from the compressor they are led to a fractionating column at some point near the center of the column. This column is the first of a series of columns for separating the various components. Higher pressures than four hundred pounds per square inch are desirable because, as the pressure is raised, higher condenser temperatures on the fractionating column may be used. The compression is preferably conducted in more than one stage of compression, and if a two stage compression is used some condensation will occur in the intercooler. This condensate will be composed largely of butane and higher hydrocarbon which may be separated from each other as described later.

This first fractionating column is maintained at the desired pressure by relieving its condenser through a pressure limiting valve of a type similar to a boiler pop safety valve. In this column the mixture is separated into two parts, one of which contains the higher gases hydrogen, methane, ethane, and ethylene and the other contains the propane, propylene, butane, butylene, and higher hydrocarbons. This fractionation is of considerable importance in the process and if not properly carried out an appreciable amount of propylene will be included in the gaseous portion leaving the condenser and thus will not be recovered. The following tabulation shows the critical temperature and the corresponding pressure for the various constituents of the gas from the reaction chamber

|  | Critical temperature 0° C. | Critical pressure pounds per sq. in. abs. |
|---|---|---|
| Butane | 153 | 530 |
| Butylene | 151 |  |
| Propane | 96 | 630 |
| Propylene | 92 | 650 |
| Ethane | 32 | 720 |
| Ethylene | 10 | 750 |
| Methane | −83 | 670 |
| Hydrogen | −240 | 190 |

In the operation of my process, I maintain the kettle or reboiler of the first fractionating column at a temperature in excess of 50° C. It is thus held above the critical temperature of hydrogen, methane, ethylene, and ethane so that these constituents of the gas cannot exist in the liquid phase at the temperature of the reboiler. The amount of these which can be held in the liquid of the reboiler thus depends solely on the solubility of these gases in the liquid of the reboiler under the conditions of temperature and pressure existing in the reboiler. As the solubility decreases with an increase in temperature and as the temperature of the reboiler is relatively high the temperature condition is not favorable for dissolving large amounts of these gases in the reboiler liquid. Further while the total pressure is relatively high in the first column, the solubility of a gas in a liquid depends not on its total pressure but on its partial pressure and due to the action of the fractionating column the gas or vapor directly over the liquid in the reboiler will contain only relatively small amounts of hydrogen, methane, ethane, and ethylene, and the partial pressure of these gases will be correspondingly low at this point. The conditions as specified are thus favorable to the elimination of these materials from the liquid of the reboiler. The liquid which is continuously drained from the reboiler to maintain the proper liquid level is thus substantially free from these lighter gases.

The condenser on the first column is a partial condenser only and the temperature is maintained at a point where all of the propylene and propane and part of the ethylene and ethane will be condensed. The material so condensed is returned to the fractionating column as reflux. The hydrogen and methane, and part of the ethylene and ethane will continuously pass out of the condenser through the pressure regulating valve and the pressure in the column will be maintained by this rejection of the correct amount of these gases. These gases leaving the condenser may be used as fuel for the cracking furnace, for operating the gas compressor or for such other purpose for which they are adapted. By the means described part of the ethylene and ethane is continuously circulated between the condenser and the upper part of the fractionating column. This circulation serves to return to the fractionating column such propylene as may escape through the top of the column and be condensed in the condenser. By maintaining a sufficient amount of this circulating ethane and ethylene, only traces of propylene will be contained in the gases leaving the condenser. The temperature required in the condenser will depend upon the pressure at which the system is operated. If operated at 400 pounds per square inch gauge pressure the cooling will have to be done by some refrigerating means, as a temperature below −30° C. will be necessary. With higher operating pressures higher temperatures can be maintained. The temperatures necessary can be easily attained by the expansion of the liquid propylene produced in the process. The propylene expanded and evaporated for the purpose can be separately recompressed and again be liquefied using water as a cooling medium.

The liquid removed from the reboiler of the first column is fed continuously into the second column near the middle of the column. The pressure in this column will be regulated entirely by the temperature of the condenser and the corresponding vapor pressure of the condensate. With ordinary cooling water and the proper operation of the first column, the pressure of the second column will be approximately 150 lbs. per square inch. There may be a considerable variation from this value and pressures from 125 pounds per square inch to 200 pounds per square inch are not unlikely. The propylene is separated at the top of the second column, a total condenser being provided to condense the entire vapors leaving the top of this column. These vapors will consist almost entirely of propane and propylene and with proper operation, both the vapors and the condensate should have a propylene content exceeding 80% of the total. The stream of condensate is split into two portions, one of which is returned to the top of the column as reflux and the other is delivered to storage from which it may be taken for use as a starting point for organic synthesis, or a portion may be used for cooling of the condenser of the first fractionating column and after recompression and recondensation be returned to storage.

As the pressure of the second fractionating column is considerably lower than that of the first, no difficulty will be experienced in withdrawing liquid from the reboiler of the first column and delivering this liquid to the second column.

The reboiler temperature of the second column should be preferably maintained at a value about 100° C. This temperature is in excess of the critical temperature of propylene. This is conducive to the elimination of the propylene from the reboiler liquid and the forcing of the propylene into the vapor for condensation as just described. The reboiler liquid will certain essentially butane, butylene and higher hydrocarbons, with only traces of propane and propylene. The level of the liquid in the reboiler is maintained by continuously draining a portion of it and delivering this liquid to the third fractionating column.

The third fractionating column separates the butane and butylene from the higher hydrocarbons. The pressure of this column, like that of the second, is dependent upon the temperature of the condenser. With ordinary cooling water, the pressure of the third column will be about 50 pounds per square inch. The column is preferably equipped with a total condenser, the output of which is divided, one part returning to the top of the column as reflux, and the balance being delivered to storage. This material may have added to it in storage an amount of butane from some other source equivalent to that used in the process and the mixture may be recycled through the cracking furnace.

As there is considerable difference in the boiling points of the butane and butylene coming off of the top of the column and the heavier hydrocarbons removed from the bottom of the column no difficulty is experienced in the separation with a reasonably efficient fractionating column. A temperature of 100° C. or less in the reboiler will usually be suitable for the operation. The reboiler level is maintained by removing a portion of the liquid through a cooler into storage.

The material condensed in the intercooler of the compressor may be led either into the second column or the third column depending on the relative pressures of the intercooler and the columns. If the intercooler pressure is sufficient to deliver the intercooler condensate into the second column, the small amount of propylene contained therein will be added to the output of propylene from the plant. The butane, butylene and higher hydrocarbons will appear in the reboiler liquid and be handled with similar materials coming through in the regular way.

If the pressure of the second column is greater than that of the intercooler, the intercooler condensate is delivered to the third column. The small amount of propane and propylene contained in the intercooler liquid will in this case be added to the butane and butylene collected at the column top for recirculation through the cracking furnace. The pressure on the column will be increased slightly by this method of operation due to the increased vapor pressure of these compounds. The heavier hydrocarbons will be removed from the reboiler with similar material coming through in the regular cycle.

The invention is illustrated by means of the accompanying diagrammatic drawing. Referring to the drawing in detail, 1 and 1a are tanks for the storage of butane and 64 and 65 are control valves on the effluent line from these tanks to the vaporizer 2, containing a heating coil 3 for circulation of a heating medium, and having valves 4 and 5 on outlet and inlet of the coil. The inlet, 7, leads to the outer shell of the heat exchanger 6, from the vaporizer, 2. This heat exchange apparatus is preferably of tubular construction, but is shown as coil construction in the diagram for reason of clarity.

The pipe 8 leads from the shell of the heat exchanger to the cracking tube 13 which is inclosed in the furnace 12 heated by gas burners 15 in the heating space 14. The pipe 17 supplies gaseous fuel to the burners, the gas supply being regulated by valve 18. The pipe 10 carries the hot gases from the cracking tube to the heat exchange tubes, and 11 is the outlet for the cracked gases to the line 16 after heat exchange has been accomplished.

The flow of gas to the low pressure cylinder 22 of the two-stage compressor 20 is regulated by means of the valve 22a. In the compression apparatus, 21 is a gas cylinder for driving the compressor, 19 is a control valve on the gaseous fuel supply line, 24 is an intercooler, and 23 is a high pressure cylinder. Any liquid condensing out of the gas in the intercooler is carried to the fractionating columns 26 or 27 through the pipe 24a and the valves 49a or 49, depending upon the pressure in the columns and the pressure in the intercooler.

The high pressure fractionating column 25 is equipped with a reboiler 28, containing a heating coil 50, through which a heating medium may be passed, and having valves 54 and 53 at inlet and outlet for control purposes. Connected to the top of the fractionating column 25 is the partial condenser 31, cooled by expansion of liquid propylene from the storage tank 36 through the expansion valve 39 into the cooling coil, 40. The vapor thus formed is again liquefied by means of the small compressor 38a and the water cooler 38b and recirculated.

The fractionating column 26, is equipped with a reboiler 29 containing a heating coil 51 through which a heating medium can be passed, and having the valves 56 and 55 at inlet and outlet for control purposes. The valve 47 on the line leading from the reboiler 28 of column 26 to the middle of the column 27 controls the passage of the liquid. A total condenser 32 is connected with the top of the column 26, cooling being accomplished by passing water through the coil 42, and regulation of the flow secured by means of valves 41 and 43. The dividing box 34 serves to return part of the condensate to the column 26 and part to the storage tank 36.

The third or lowest pressure column 27 is equipped with the reboiler 30 heated by the coil 52 which is equipped with valves 58 and 57. Valve 59 controls the flow of liquid from reboiler 30 through the cooling coil 59a. A total condenser 33 is connected to the top of the column 27, having a water cooling coil 45, equipped at outlet and inlet with valves 44 and 46. A dividing box 35 serves to return part of the condensate to the column 27, allowing the rest to flow to the storage tank 37. Means are provided whereby this condensate or butane can flow through valve 66 to storage tank 63, and through valves 61 and 62 to the main storage tanks 1 and 1a, to be recirculated through the system. The valve 67 provides means of introducing fresh butane into the system.

The heavier hydrocarbons in the reboiler 30 are drawn off through the valve 59 to the storage tank 60 through the water cooler 59a.

Returning to the first fractionating unit, 38 is a pressure limiting valve on the condenser 31 similar to a steam safety valve and feeds the gaseous fuel supply line 17; 17a is a valve whereby this gaseous fuel may be drawn off or whereby other fuel may be introduced into the system.

In the operation of my process, valve 65 is opened and liquid butane is forced under pressure from the tank 1a to the vaporizer 2 by means of the vapor pressure on the surface of the liquid, valve 62 being closed. Valves 4 and 5 are opened and steam is passed through the coil of the vaporizer at sufficient temperature and pressure to vaporize the liquid so that the vapor is delivered to the heat exchanger at a temperature of about 100° C. and 95 pounds per square inch gauge. In the heat exchanged the vapors are heated to a temperature of about 500° C. leaving through the outlet 8, and are delivered to the cracking chamber 13, at a pressure of about 75 pounds per square inch gauge. Here the vapors are heated to a temperature between 650° C. and 700° C. in about 1 second, by means of the gas burners 15. About 30–45% of the butane is decomposed and the remaining butane together with the other hydrocarbons resulting from the decomposition consisting of propylene, butylene, ethylene, ethane, methane, propane and hydrogen are passed through the tubes 9 of the heat exchanger, thus heating the incoming butane. The vapors are then delivered to the compressor 20 at a pressure of about 15 pounds gauge and are compressed in two stages to about 400 pounds gauge. Part of the vapors may condense in the intercooler 24, and the liquid thus formed is forced through the valve 49 into the column 27 or through valve 49a into column 26, depending upon the pressures in the columns.

The vapors at about 400 pound gauge are then forced through pipe 23—a into the high pressure column 25, where they are separated into two parts, the butane, butylene, propane and propylene collecting in the reboiler 28. The methane, ethane, ethylene and hydrogen pass to the partial condenser 31, where part of the ethane and ethylene is condensed and returns to the column as reflux. The reboiler is heated by steam passing through the coil 50, the valves 53 and 54 being open, and a temperature of about 60° C. is maintained.

The condenser 31 is cooled to a temperature below −20° C. by expanding liquid propylene in the coil 40 through the expansion valve 39, and the resulting vapors are then liquefied by means of the compressor and cooling coil 38a and returned to the storage tank 36.

The methane and hydrogen, and part of the ethylene and ethane escape from the partial condenser through the pressure limiting valve 38 to the fuel supply line 31a, in such a manner that the pressure is kept constant in the column at slightly below 400 pound gauge. The valve 47 is regulated so that the liquid flow from reboiler 28 to the middle of column 26 is such as to keep the liquid level in the reboiler constant.

The second column 26, separates the propylene and propane from the butane, butylene and heavier hydrocarbons. This column is maintained at a temperature of about 100° C. by means of steam circulating through the coil 51 of the reboiler 29 and the pressure of the column is about 150 pound gauge. The propylene and propane pass to the top of the column and into the total condenser 32, which is cooled by water flowing through the coil 42. The condensed propylene and propane flow to the dividing box 34, where part of the liquid passes back to the column for reflux and the rest flows to the propylene storage tank 36.

The butane, butylene and heavier hydrocarbons remaining in the reboiler 29 are fed to the center of the column 27, and the flow so regulated by the valve 48 that the level of the liquid in the reboiler is kept constant. The column, 27, is maintained at a pressure of about 50 pounds gauge and the temperature of the reboiler 30 is maintained at 100° C. or less, so that a separation of the butane and butylene and the heavier hydrocarbons is accomplished. The butane and butylene vapors pass to the top of the column to the total condenser 33 which is cooled by water flowing through the coil 45. The condensate flows to the dividing box 35 where part of it is returned to the column for reflux, the rest going to the storage tank 37. The heavier hydrocarbons remain as liquid in the reboiler 30, and the level of the liquid in the reboiler is kept constant by the control valve 59. The heavier hydrocarbons are passed through the cooler 59a to the storage tank 60.

The recovered butane can be fed to the storage tank 63 by opening valve 66 and can be stored in the main storage tank 1 by opening valve 61.

It will then be available for recycling. New butane can be introduced into the system through the valve 67, to resupply that used up in the process. The compressor and gas burners consume as fuel the methane, ethane, ethylene and hydrogen released from the condenser 31, and any other fuel may be introduced through the valve 17a.

In the description of my process given above, I do not limit my invention to the particular pressures and temperatures set forth; in fact, the pressures and temperatures may vary considerably from those stated, to the accomplishment of the same end. I also do not limit myself to the exact arrangement of the apparatus as shown in the drawing, as some of the pieces of equipment may be changed slightly without essentially altering the process.

After describing my process what I claim is:

1. The method of producing propylene which comprises thermally decomposing a mixture of hydrocarbon gases consisting essentially of butane and isobutane, compressing the mixture of the products of decomposition to pressures in excess of 300 pounds per square inch, fractionating the mixture at such pressures and at temperatures above the critical temperatures of such light gases as hydrogen, methane, ethylene and ethane, separating such light gases from the remainder of the products which remain as liquid under these conditions, refractionating the liquid from the first fractionation at an appreciably lower pressure and at a temperature above the critical temperature of propylene, removing the propylene as a vapor from the other constituents, and then condensing the propylene vapor to a liquid concentrate containing a high percentage of propylene, refractionating the remaining liquid at still lower pressure, separating the butane and butylene from the heavier hydrocarbons as vapor, condensing to a liquid and returning this liquid to the thermal decomposition stage of the process.

2. The method of producing propylene which comprises thermally decomposing a mixture of hydrocarbons consisting essentially of butane and isobutane, compressing the resulting mixture of gases and vapors consisting of butane, propane, ethane, methane, hydrogen, propylene, ethylene, butylene, and heavier hydrocarbons to pressures in excess of 300 pounds per square inch, fractionating the mixture at this high pressure and at a temperature above the critical temperature of the lighter gases, effecting the removal of methane, ethane, ethylene and hydrogen from the other constituents, fractionating the remaining liquid at an appreciably lower pressure and at a temperature in excess of the critical temperature of propylene, removing the propylene from the mixture as a vapor and then condensing to form a liquid concentrate containing a high percentage of propylene; refractionating the remaining liquid, removing the butane and butylene from the heavier hydrocarbons as vapor and then condensing the vapor to a liquid and returning this liquid to the thermal decomposition stage of the process.

3. The method of removing propylene from a mixture of hydrocarbons and other gases resulting from the thermal decomposition of hydrocarbon mixtures consisting essentially of butane and isobutane, which comprises compressing the products of the decomposition to pressures in excess of 300 pounds per square inch, fractionating the mixture at this pressure and at a temperature in excess of the critical temperatures of the lighter gases, maintaining the mixture at such a temperature that part of the lighter gases will condense and act as reflux separating and removing these gases from the remaining hydrocarbons, refractionating the remaining products at an appreciably lower pressure and at a temperature in excess of the critical temperature of propylene, removing the propylene as vapor and condensing to a liquid concentrate containing a high percentage of propylene, returning a portion of the propylene concentrate to the last named refractionation stage to act as reflux, refractionating the remaining mixture of constituents to remove the butane and butylene as vapor from the heavier hydrocarbons, condensing the butane and butylene to a liquid and returning a portion of this condensate to the last-named refractionation stage as reflux, and returning the remaining condensate to the thermal decomposition stage of the process.

4. The method of producing propylene which comprises thermally decomposing a mixture of hydrocarbons consisting essentially of butane and isobutane, compressing the resulting mixture of vapors and gases to pressures in excess of 300 pounds per square inch, fractionating the mixture at this high pressure and at a temperature in excess of 50° C., effecting the removal of such gases as ethane, ethylene, methane, and hydrogen from the other constituents, fractionating the remaining liquid at an appreciably lower pressure at a temperature in excess of 100° C. and removing the propylene from the mixture as a vapor and then condensing to form a liquid concentrate containing a high percentage of propylene, refractionating the remaining liquid, removing the butane and butylene from the heavier hydrocarbons as a vapor and then condensing the vapor to a liquid and returning the liquid to the thermal decomposition stage of the process.

5. The method of producing propylene which comprises thermally decomposing a mixture of hydrocarbons consisting essentially of butane and isobutane, compressing the resulting mixture of vapors and gases to pressures in excess of 300 pounds per square inch, fractionating the mixture at this high pressure and at a temperature in excess of the critical temperatures of such light gases as ethane, ethylene, methane, and hydrogen, cooling the mixture below the 0° C. by means of the expansion of liquid propylene, condensing part of the ethane and ethylene in the mixture of methane, ethane, ethylene and hydrogen to serve as reflux, separating and removing these light gases from the remaining hydrocarbons, fractionating the remaining liquid at an appreciably lower pressure and at a temperature above the critical temperature of propylene, removing the propylene from the mixture as a vapor and then condensing to form a liquid concentrate containing a high percentage of propylene, refractionating the remaining liquid, removing the butane and butylene from the heavier hydrocarbons as a vapor, and then condensing the vapor to a liquid and returning this liquid to the thermal decomposition stage of the process.

6. The steps in the process of producing propylene by thermal decomposition of butane which comprise compressing the decomposition products to a pressure in excess of four hundred pounds, heating the liquid to a temperature in excess of 50° C. while refluxing propylene-containing distillate therein, and thereafter vaporizing from the residue of this fractional vaporization a distillate fraction of high propylene content.

7. The steps in recovering propylene by thermal decomposition of butane which comprise vaporizing under pressure from the decomposition products, compounds of lower boiling point than propylene and then obtaining a fraction including a high percentage of the propylene by refluxing at a pressure between 125 and 200 pounds.

HENRY ROSENTHAL.